United States Patent
Meek et al.

(10) Patent No.: US 7,283,624 B1
(45) Date of Patent: Oct. 16, 2007

(54) IDLE DETECTION FOR ANSWER SUPERVISION

(75) Inventors: Jeffrey James Meek, Bonny Doon, CA (US); James Conrad Price, Santa Cruz, CA (US); Helen Marguerite Robison, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 812 days.

(21) Appl. No.: 10/206,490

(22) Filed: Jul. 25, 2002

(51) Int. Cl.
*H04M 15/00* (2006.01)

(52) U.S. Cl. .......................... 379/114.01; 379/114.03; 379/114.09; 379/114.28

(58) Field of Classification Search ............. 379/32.01, 379/32.02, 2, 22.04, 28, 201.01, 88.12, 88.22, 379/93.01, 114.01, 114.03, 114.09, 114.28; 370/352, 236, 498; 455/557, 414.1
See application file for complete search history.

(56) References Cited

U.S. PATENT DOCUMENTS

| | | | |
|---|---|---|---|
| 5,870,397 A * | 2/1999 | Chauffour et al. | 370/435 |
| 5,946,384 A * | 8/1999 | Yee et al. | 379/215.01 |
| 6,088,600 A * | 7/2000 | Rasmussen | 455/574 |
| 6,167,118 A * | 12/2000 | Slivensky | 379/88.03 |
| 6,725,060 B1 * | 4/2004 | Chhatriwala et al. | 455/556.2 |
| 6,768,722 B1 * | 7/2004 | Katseff et al. | 370/260 |
| 7,058,066 B1 * | 6/2006 | Garakani et al. | 370/401 |
| 7,103,159 B2 * | 9/2006 | Gandhi et al. | 379/93.09 |
| 2002/0136224 A1 * | 9/2002 | Motley | 370/401 |
| 2002/0150091 A1 * | 10/2002 | Lopponen et al. | 370/389 |
| 2003/0086444 A1 * | 5/2003 | Randmaa et al. | 370/526 |
| 2003/0206563 A1 * | 11/2003 | Lazarus et al. | 370/526 |

* cited by examiner

*Primary Examiner*—Barry Taylor
(74) *Attorney, Agent, or Firm*—Marger Johnson & McCollom, P.C.

(57) ABSTRACT

A network device has the capability of monitoring voice over data networks calls. The network device includes a voice activity detector that detects voice activity on a voice channel. If no voice activity is detected, the network device disconnects the call. The network device may optionally provide a user interactive feature that allows a user to prevent the call from being disconnected.

24 Claims, 4 Drawing Sheets

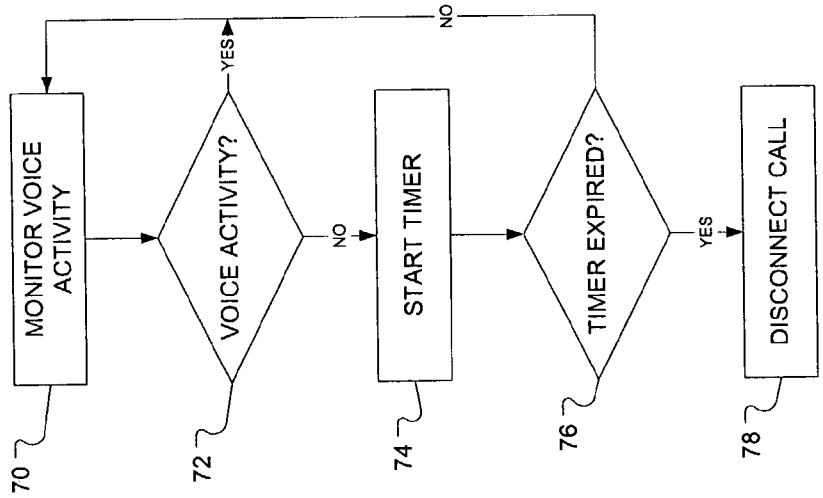
Figure 4
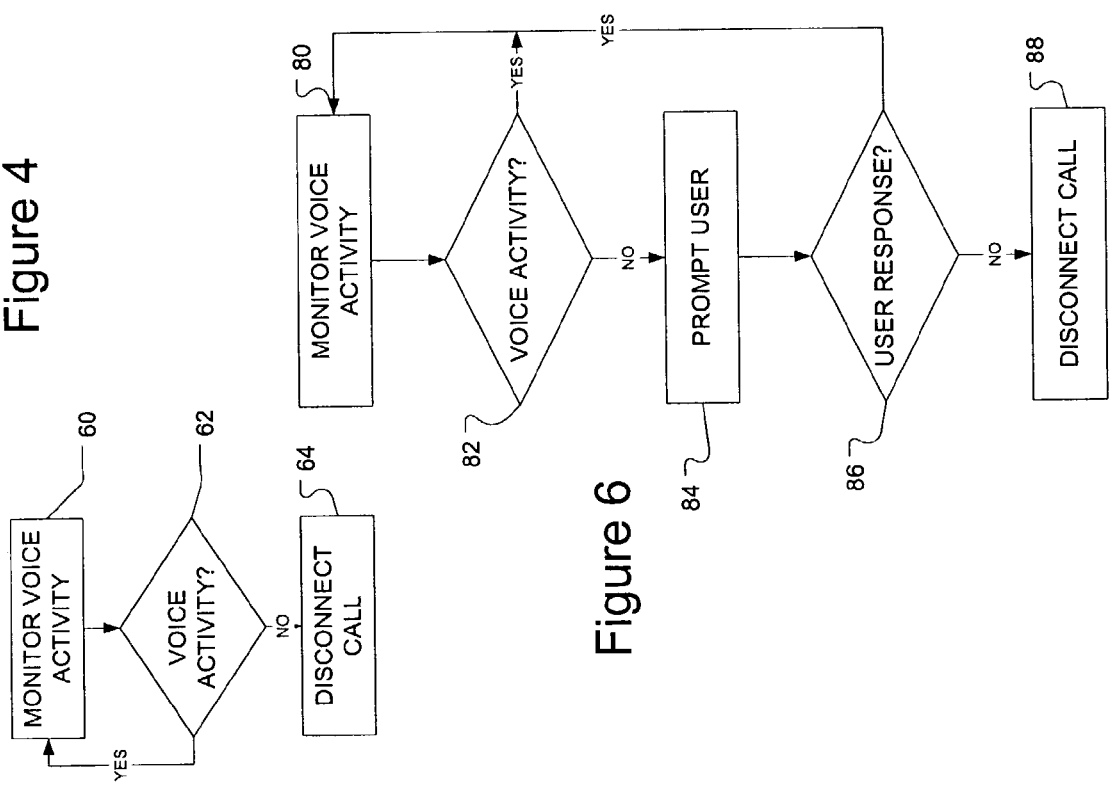
Figure 5
Figure 6

IDLE DETECTION FOR ANSWER SUPERVISION

BACKGROUND

1. Field

This disclosure relates to voice over data networks, more particularly to idle voice detection over data networks.

2. Background

As an alternative to a standard public switched telephone network (PSTN) telephone calls, some users place their calls across data networks. The data network phone call involves equipment that translates the voice traffic of the phone call into data packets and transmits the packets across the data network to be reassembled and translated back into voice at the other end. While data network calls may involve Voice over Frame Relay (VoFR), Voice over Asynchronous Transfer Mode (VoATM), Voice over Internet Protocol (VoIP) as well as other network protocols, for ease of discussion all of these will be referred to as VoIP.

In a VoIP call, a user picks up the handset of the phone. The equipment that will handle the VoIP call sends a dial tone to the user, who then dials the number of the receiving end. The network device involved in the sending end of the call will then map the phone number to an IP destination or IP next hop device) that will complete the call to the receiving phone. The presentation of dial tone and the transmission of touch tones provides the interface by which a human and the network device exchange signaling information. The two IP stations, the sending and the receiving ends, then establish a channel over the network, which may involve multiple hops or signaling exchanges through the IP network. The phone call then proceeds as a typical phone call. When either end of the call hangs up, the session ends. Generally, the calling end, also referred to as the originating or sending station, relies upon a termination signal from the called end, also called the receiving or terminating end. In some instances, because of signaling adaptation, the terminating end may not send the termination signal, or the signal is not interpreted correctly at the various pieces of equipment between the two ends of the call. Generally, this occurs because inband traffic (bearer traffic) in a phone call (Voice) over data network is not monitored. The equipment just passes packets of voice data between the two stations; it does not analyze the content of the Voice data packets.

This may cause billing issues, because the local telephone company may charge the VoIP provider for a non-revenue generating call. The measured duration of a VoIP call leg may not match the duration of a PSTN call leg because the signaling is not propagated or interpreted correctly. This results in a discrepancy in billing records that must be resolved before usage can be billed. It may also lead to resource issues, as an actually idle port may be held out of the port pool as being unavailable. When there is no active conversation in progress on those resources. This leads to poor port utilization and results in system inefficiencies.

Therefore, it would be useful if a method and apparatus were available that could determine if a call were actually terminated and disconnect all legs associated with that call.

SUMMARY

One embodiment is a network device having the capability of monitoring voice over data networks calls. The network device includes a voice activity detector that detects voice activity on a voice channel. If no voice activity is detected, the network device disconnects the call. The network device may optionally provide a user interactive feature that allows a user to prevent the call from being disconnected. The network device may include a configurable timer to time a period within which there is no voice activity.

Another embodiment is a method of monitoring voice activity on a call. The method monitors a voice channel for voice activity. If no voice activity is detected, the method disconnects the call. The method may include configuring a timer to define a period within which, if there is no voice activity, the call will be disconnected.

BRIEF DESCRIPTION OF THE DRAWINGS

The invention may be best understood by reading the disclosure with reference to the drawings, wherein:

FIG. 4 shows a flowchart of an embodiment of a method of monitoring a voice over data networks call, in accordance with embodiments of the invention.

FIG. 5 shows a flowchart of an alternative embodiment of a method of monitoring a voice over data networks call, in accordance with embodiments of the invention.

FIG. 6 shows a flowchart of another alternative embodiment of a method of monitoring a voice over data networks call, in accordance with embodiments of the invention

DETAILED DESCRIPTION OF THE EMBODIMENTS

As mentioned previously, voice over data network calls are specialized types of data transfers that different significantly from data transfers or calls. In synchronous data calls with an unrestricted digital speech bearer capability there is a feature referred to here as a "dialer idle-timeout". With this "dialer idle-timeout", the system looks at the contents of the packet to determine if it was interesting according any access control lists (ACLs) under the system's defined dialer group. If there have been no defined "interesting" packets within the user-configured idle timeout period, the call is disconnected. An 'interesting' packet is defined by the system administrator.

A further implementation includes a dynamic idle-timeout, which determined the billing or charging period in addition to the idle period. In this case, referred to here as "short-hold idle-timeout", the user takes advantage of the billing period that has already been paid for. If the call continues to be idle for a configured period after the end of the charging period, the call is disconnected.

In general terms, then the system can change the definition of what is an 'interesting' packet. For a voice call, the system is interested in looking at the data packet to determine Whether there is any active speech contained in the voice data packet. Further, the system may allow a static configuration in cases where it is either too early or impossible to determine the charging period, as well as a dynamic idle timeout.

Figure 1:
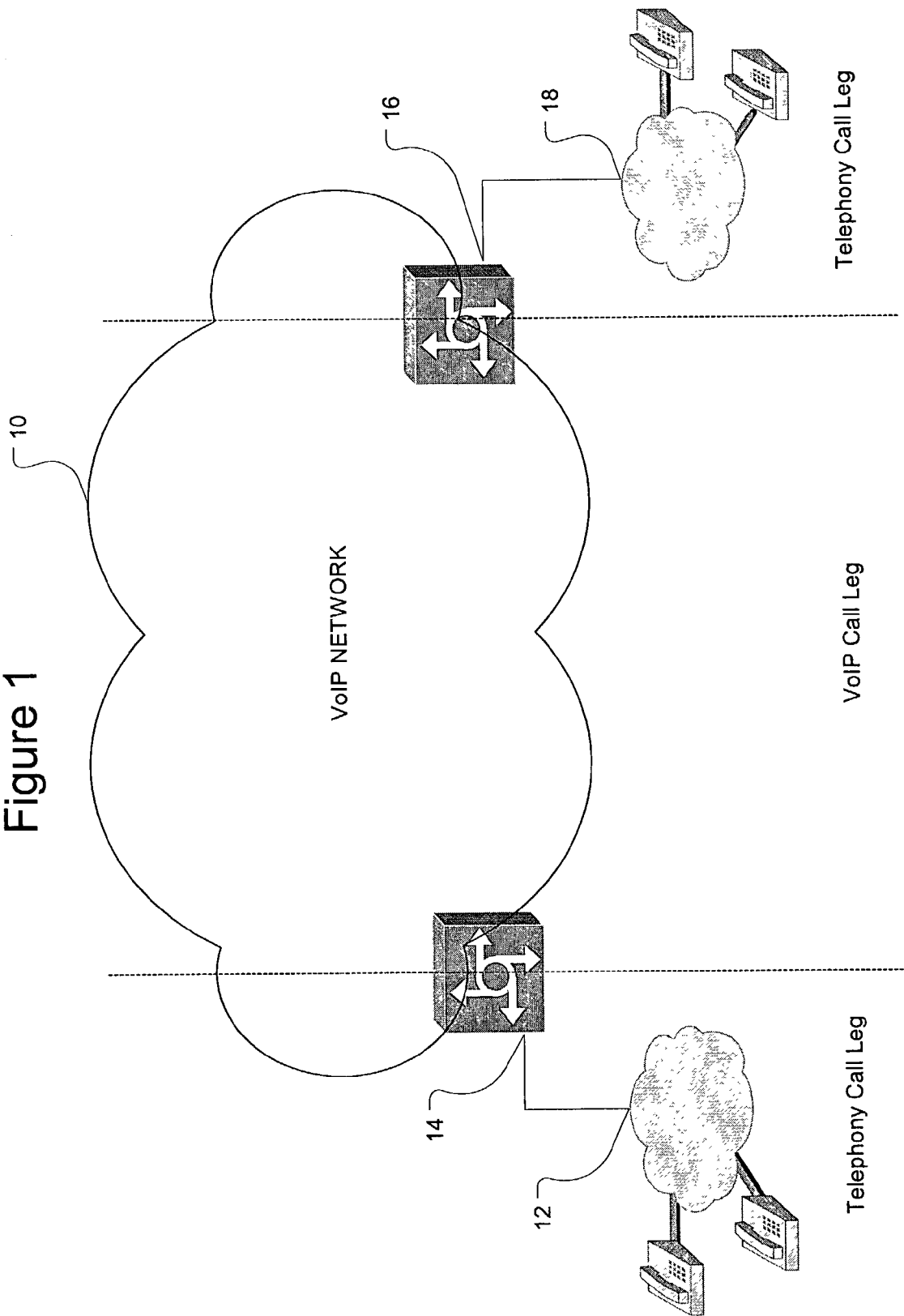
FIG. 1 shows one embodiment of a voice over data networks system, in accordance with embodiments of the invention.
Figure 2:
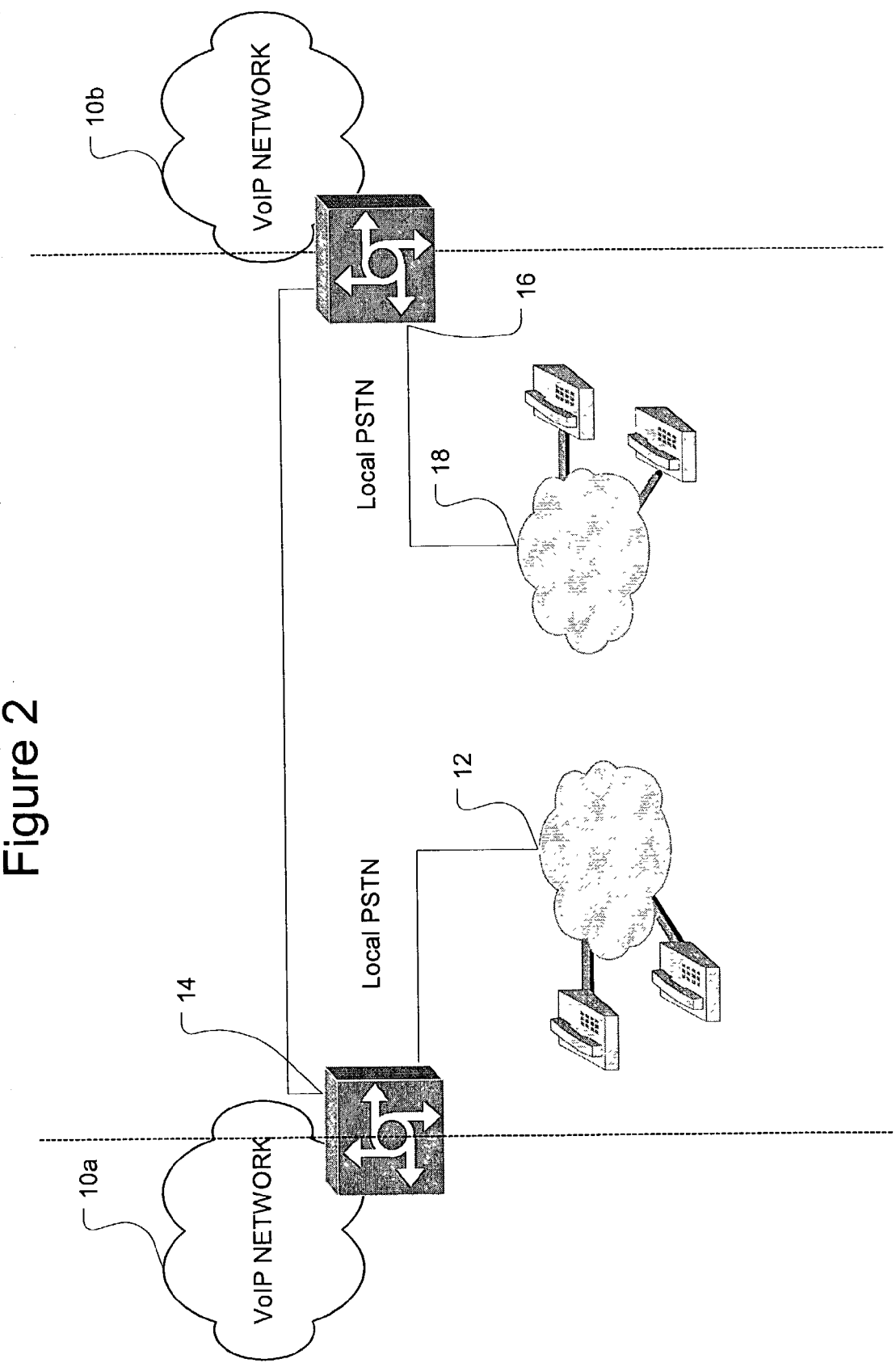
FIG. 2 shows an alternative embodiment of a voice over data networks system, in accordance with embodiments of the invention.

FIG. 1 shows one embodiment of a voice over data network system. The data network in this example is shown as a Voice over Internet Protocol network (VoIP), but could be any type of data network. The VoIP network 10 links the endpoints 12 and 18, which in turn provide users with telephone service. The telephony call legs connect to the VoIP network through gateways 14 and 16. In this particular example, the gateways are providing 'service' to the phones.

The term 'service' as used here is service as in a foreign exchange service (FXS). In the public switched telephone network (PSTN) the FXS is that which connects directly to standard telephones and provides the services of ring, voltage, digit collection and dial tone. The services required for human and telephony machine interaction. This is differentiated from FXO, or foreign exchange office. An FXO connects to a PSTN central office and is the interface offered on a standard telephone. In the example of FIG. 1, the FXO is in the telephony call legs from endpoints 12 and 18, which are connected to each other through the voice data network 10.

In an example of a problem that may occur, a phone connected to endpoint 12 places a call to a phone connected to endpoint 18. The call routes through gateway 14 across the VoIP network 10 to gateway 16. When the call ends and both parties hang up, the end-to-end conversation between points 12 and 18 has ended. However, because the FXO interfaces are connected to together, there is no longer any interaction between the endpoints and there is no indication to the devices 14 and 16 that the voice conversation has ended.

Typically the PSTN would signal the termination of a call to a handset such as either 12 and 18 by means of silence or a "howler" tone. Normally a human would hear this silence or "howler" and hang up the handset.

A voice gateway such as 14 and 16 does not currently monitor the inband sound in a voice call to determine whether or not to hang up the call. Because of the minimal signaling, potentially passing across multiple hops, the termination signal may not map correctly from one end of the call to the other, leaving one of the PSTN telephony call legs appearing as connected, when the call has actually been terminated. Where the terminated gateway does not have the opportunity to terminate the call, situations of minimal signaling may result in calls not terminating properly.

In either of these configurations, among many others, the lack of a network device termination signal leads to the billing and resource problems discussed above. A network device capable of monitoring the call could determine if the call were still active. The network device could then send the appropriate signals to terminate the call, if necessary. A network device to monitor voice calls is shown in FIG. 3.

Figure 3:
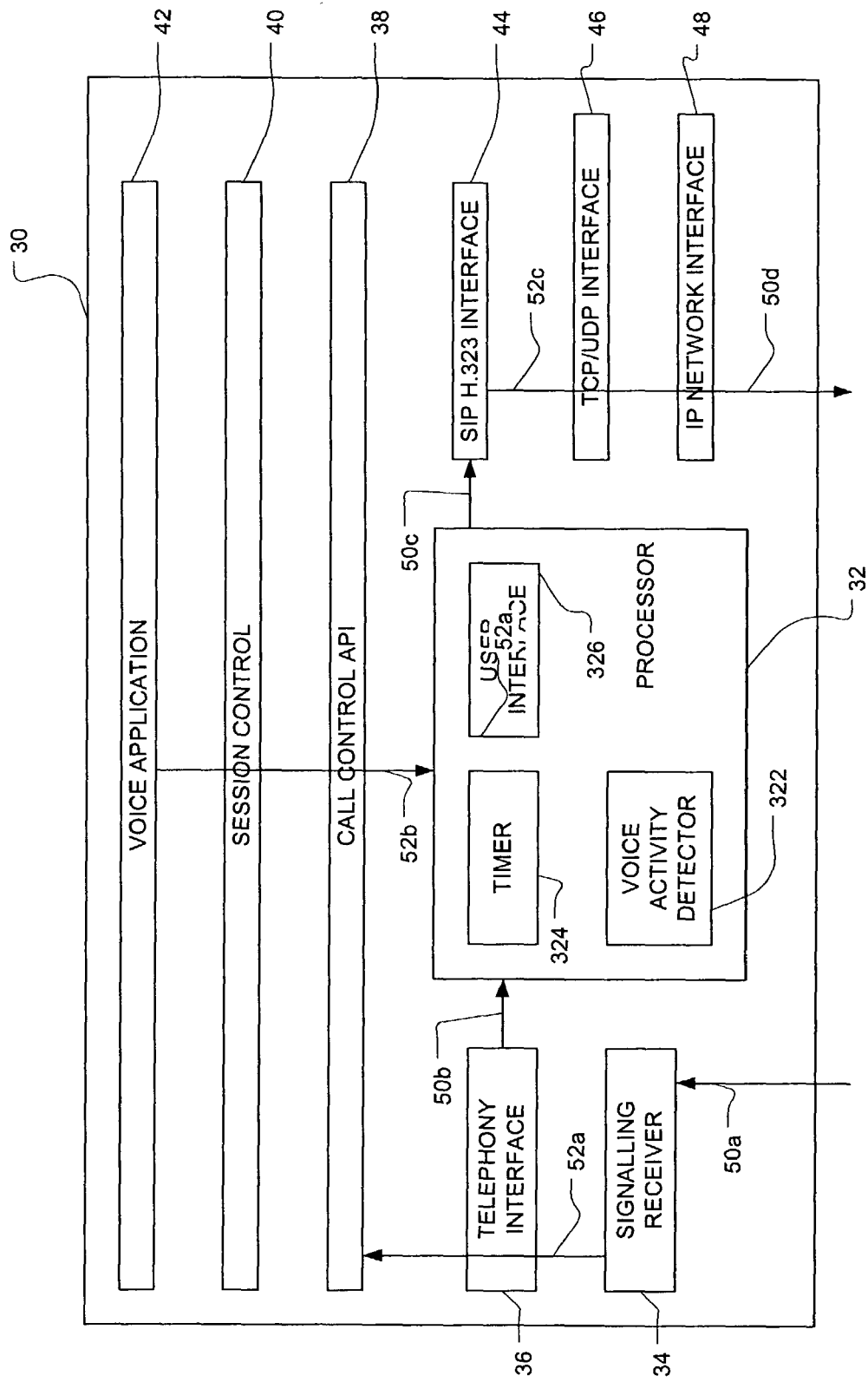
FIG. 3 shows a block diagram of a network device, in accordance with embodiments of the invention.

The portrayal of the device in FIG. 3 includes both hardware and software components of the device. In some implementations some of the components may be implemented in hardware and other in software, with many components implemented as either. No limitation on the hardware or software of the network device is intended by the following discussion and is for example purposes only.

The network device 30 has a processor 32, such as a digital signal processor, although it could be any kind of general-purpose processor as well. The processor may also include a voice activity detector 322, a timer 324 and a user interface 326. These components will more than likely be implemented as instruction sets on the processor, but may be implemented as separate hardware components as well. The user interface 326 may include components that convert digital signals to audio signals to prompt the user, as will be discussed in more detail later.

In addition, the network device may include various interfaces to allow the processor to communicate with other devices on the network. The signaling receiver 34 may be a port that receives the signals from the network, such as digital signals in the form of data packets, or voice signals in the form of voice data packets. The telephony interface 36 then receives the signals relevant to the telephone interaction, such as ring signals, dial tone, on/off hook signals, setup message, etc. There are two different paths for the network device. The path 50, comprising signals 50*a*, 50*b*, 50*c* and 50*d*, are the path followed by the media, in this case the voice data packets or voice signals that form the content of the voice call. The path 52, comprising 52*a*, 52*b*, and 52*c* is the internal device signaling path that handles the communications between various components of the network device and the other devices on the network that are involved in the call.

The voice application 42 may comprises a script that is run on the processor that handles the interface between the audible signals received from the user and the conversion of those signals to digital data. The session control 40 and call control API 32 manage the call functions such as establishing and maintaining the connection. The call signaling interface, commonly SIP (Session Initiation Protocol) and H.323, (International Telecommunications Union standard H.323 on audiovisual conferencing on data networks), ensures that the necessary signals are sent to allow the call to comply with these standards. Similarly, the Transmission Control Protocol (TCP) and IP network interfaces are available to provide a transport layer to the call signaling and media streams.

Generally, network devices involved in voice over data networks calls do not actually monitor the data transmission to determine if the call is still active. These devices typically rely on the various control signals that communicate set up, routing, authentication and other call management signals to determine when the call ends. For the reasons discussed above, however, these signals are sometimes not transmitted. The network device 30 may have the voice application generate a 'polling' or query to the processor to determine if the call is still active. This may be done using a scripting language, such as the Toolkit Command Language (TCL) utilized by Cisco Systems.

Some applications currently poll the processor 32 for statistics periodically, and one of those statistics is sound level. Typically, these applications do not do anything with the sound level except store it. That sound level check may trigger the call control layers 38, 40, and 42 to take note of the fact that a channel may now be "idle". The device can then use compiled options within call control, or a scripting language, such as TCL, to monitor the results of the sound level checks and tear down the call if appropriate.

In this manner, the polling or query of the processor 32 would cause the processor to monitor the voice activity using the voice activity detector 322. Alternatively, the query may cause the processor to prompt the user. If the user does not responds to the prompt, or if the voice activity detector does not detect any voice activity, the processor would then disconnect the call by sending the appropriate signals to the network. Some examples of how this process may occur are shown in FIGS. 4-6.

FIG. 4 shows a simple implementation of call monitoring. At 60, the call is monitored. As discussed above, the monitoring may be performed by a voice activity detector in a processor of the network device 30, or by prompts to the user, as examples. If no voice activity is detected at 62, then the call is disconnected at 64. Disconnection of the call will typically involve the network device 30 transmitting the appropriate signals across the network.

In one embodiment, the monitoring of the voice activity may be timed. A flowchart of one example of this embodiment is shown in FIG. 5. At 70, the monitoring process begins. At 72, the system determines if there is voice activity on the channel. If there is, the process returns to the passive monitoring state. If no voice activity is detected, rather than immediately disconnecting the call, the system initiates a timer at 74. If the timer has expired at 76 with no voice activity being detected, the call is disconnected at 78. Typically, within the process of determining if the timer has expired, the timer would be reset if voice activity were detected. Any detection of voice activity will stop the disconnection process and the process will return to monitoring voice activity at 70.

These various techniques for monitoring voice activity, timing the period of no voice activity and a user interaction may be mixed and matched as desired by the system designer. For example, in FIG. 6, an alternative embodiment is shown. The voice activity is monitored at 80. If no voice activity is detected at 82, the user is prompted with a query. The query may be something along the lines of "If you wish to remain connected to this call, please press the pound key." If the user responds at 86, the call remains connected. If no response is detected, the call is disconnected at 88. Typically, a time period will be set within which the user should respond. For example, once the user is prompted, if there is no response within 10 seconds, the call may be disconnected.

As mentioned previously, these methods may be implemented in the processor as instruction sets of machine-readable code. In this example the machine-readable code causes the machine, which in this case is the processor, to execute the methods of the invention. The instruction sets of machine-readable code are typically contained on an article of some kind, whether that article is a downloadable file, a computer disk or other machine-readable media.

In this manner, the VoIP provider can avoid discrepancies in call duration records when providing connectivity services between similar and dissimilar networks. It also allows the VoIP provider to increase the efficiency of the port utilization within the system.

Thus, although there has been described to this point a particular embodiment for a method and apparatus of monitoring voice over data networks call, it is not intended that such specific references be considered as limitations upon the scope of this invention except in-so-far as set forth in the following claims.

What is claimed is:

1. A network device, comprising:
   a voice activity detector to detect voice activity on a voice channel associated with a call;
   a processor to identify whether a current charging period for the call is determined; and
   a timer to start timing when no voice activity is initially detected on the channel, the timer to time for:
      a time remaining in the current charging period if the current charging period is determined; and
      a configurable time if the current charging period is undetermined;
   wherein the processor is configured to disconnect the call if no voice activity is detected before the timer expires.

2. The network device of claim 1, wherein the network device further comprises a user interface through which the network device receives a user input indicating that the call is still active.

3. The network device of claim 1, wherein the voice activity detector resides coincident with the processor.

4. The network device of claim 1, wherein the voice activity detector and the processor are contained in a digital signal processor.

5. The network device of claim 1, wherein the voice activity detector further comprises software instructions operating in the processor.

6. A method of monitoring a voice call, the method comprising:
   monitoring voice activity on a call;
   identifying whether a current charging period is determined;
   starting a timer when no voice activity is detected, the timer started for:
      a time remaining in the current charging period if the current charging period is determined; and
      a configurable time if the current charging period is undetermined; and
   if no voice activity occurs before the timer expires, disconnecting the call.

7. The method of claim 6, wherein the method further comprises requesting a user response prior to disconnecting the call and timing a period for response from the user.

8. The method of claim 7, wherein if a user response is received, the call is not disconnected.

9. The method of claim 7, wherein the period for response from the user is a time until the end of the current charging period.

10. The method of claim 6, wherein disconnecting the call further comprises sending a termination signal to at least one network device associated with the call.

11. The method of claim 6, wherein monitoring voice activity further comprises utilizing a voice activity detection mechanism.

12. The method of claim 6, wherein monitoring voice activity further comprises polling a processor for its voice activity detection status.

13. The method of claim 6, wherein the configurable time is determined by a scripting language.

14. The method of claim 6, wherein the configurable time is determined by a call control application program interface.

15. A network device, comprising:
   a means for detecting voice activity on a voice channel associated with a call;
   means for identifying whether a current charging period for the call is determined;
   means for starting a timer for a time period when no voice activity is initially detected on the channel, the time period set to:
      a time remaining in the current charging period if the current charging period is determined; and
      a configurable time if the current charging period is undetermined;
   a means for disconnecting the call if no voice activity is detected before the time period expires.

16. The network device of claim 15, wherein the network device further comprises a means for receiving a user input indicating that the call is still active.

17. The network device of claim 15, wherein the means for detecting resides coincident with the means for disconnecting.

18. The network device of claim 15, wherein the means for detecting and the means for disconnecting are contained in a processor.

19. The network device of claim 15, wherein the means for detecting further comprises software instructions operating in the means for disconnecting.

20. An article of machine-readable code embodied in a machine-readable medium that, when executed causes the machine to:
- monitor data packets associated with a call;
- identify whether a current charging period for the call is determined;
- determine voice activity on the call by examining the data packets for active speech within the data packets;
- monitor the voice activity during a time period;
- if no voice activity occurs during the time period, disconnect the call;
- wherein the time period is:
  - a time remaining in the current charging period if the current charging period is determined; and
  - a configurable time if the current charging period is undetermined.

21. The article of claim 20, wherein the code further includes instruction that, when executed, cause the machine to request a user response prior to disconnecting the call.

22. The article of claim 21, wherein the code further includes instruction that, when executed, cause the machine to not disconnect the call if a user response is received.

23. The article of claim 20, wherein the code further includes instruction that, when executed, cause the machine to send a termination signal to at least one network device associated with the call.

24. The article of claim 20, wherein the code causing the machine to monitor voice activity further comprises code that causes a processor to poll a voice activity detector.

* * * * *